United States Patent
Xu et al.

(10) Patent No.: US 8,595,006 B2
(45) Date of Patent: Nov. 26, 2013

(54) SPEECH RECOGNITION SYSTEM AND METHOD USING VECTOR TAYLOR SERIES JOINT UNCERTAINTY DECODING

(75) Inventors: Haitian Xu, Cambridge (GB); Mark John Francis Gales, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 910 days.

(21) Appl. No.: 12/732,700

(22) Filed: Mar. 26, 2010

(65) Prior Publication Data

US 2011/0015925 A1    Jan. 20, 2011

(30) Foreign Application Priority Data

Jul. 15, 2009  (GB) .................................. 0912319.1

(51) Int. Cl.
*G10L 15/00*  (2013.01)
*G10L 15/06*  (2013.01)

(52) U.S. Cl.
USPC ............ 704/244; 704/240; 704/236; 704/233

(58) Field of Classification Search
USPC ................................................. 704/231–257
See application file for complete search history.

(56) References Cited

U.S. PATENT DOCUMENTS

| | | |
|---|---|---|
| 2003/0191637 A1 | 10/2003 | Deng et al. |
| 2008/0059163 A1 | 3/2008 | Ding et al. |
| 2009/0144059 A1 | 6/2009 | Yu et al. |

FOREIGN PATENT DOCUMENTS

| | | |
|---|---|---|
| EP | 0 886 263 A2 | 12/1998 |
| EP | 0 886 263 A3 | 12/1998 |
| EP | 1 396 845 A1 | 3/2004 |
| EP | 1 688 921 A1 | 8/2006 |

OTHER PUBLICATIONS

Acero et al. ("HMM Adaptation Using Vector Taylor Series for Noisy Speech Recognition". In Proc. of ICSLP, Sep. 2000).*
Gales, M.J.F. ("Maximum likelihood linear transformations for HMM based speech recognition". Computer Speech and Language, vol. 12, Jan. 1998).*
Gales et al. ("Predictive linear transforms for noise robust speech recognition". In Proc. of ASRU, Dec. 2007).*
Li et al. ("High-performance HMM adaptation with joint compensation of additive and convolutive distortions via vector Taylor Series". In Proc. of ASRU, Dec. 2007).*
Liao et al. ("Adaptive training with joint uncertainty decoding for robust recognition of noisy data". In Proc. of ICASSP, 2007).*

* cited by examiner

*Primary Examiner* — Jesse Pullias
(74) *Attorney, Agent, or Firm* — Oblon, Spivak, McClelland, Maier & Neustadt, L.L.P.

(57) ABSTRACT

A speech recognition method and system, includes receiving in a first noise environment a speech input having a sequence of observations; determining a likelihood of a sequence of words arising from the sequence of observations using an acoustic model trained to recognize speech in a second noise environment, the model having a plurality of model parameters relating to the probability distribution of a word or part thereof being related to an observation; and adapting the model trained in the second environment to that of the first environment.

19 Claims, 4 Drawing Sheets

SPEECH RECOGNITION SYSTEM AND METHOD USING VECTOR TAYLOR SERIES JOINT UNCERTAINTY DECODING

CROSS-REFERENCE TO RELATED APPLICATIONS

This application is based upon and claims the benefit of priority from UK application number 0912319.1 filed on Jul. 15, 2009; the entire contents of which are incorporated herein by reference.

TECHNICAL FIELD

The present invention is concerned with the technical field of pattern recognition and specifically speech recognition. More particularly, the present invention is concerned with speech recognition in noisy environments.

TECHNICAL BACKGROUND

Speech recognition is a technique which relies on the use of trained models such as Hidden Markov Models (HMMs) to decode an audio speech signal into recognisable words which can either be displayed or further processed. Further processing may include outputting the text into a language translation device or converting it into an understandable instruction for use voice controlled apparatus.

Generally, the models are trained in a noise-free environment. However, in use, the systems are generally used in relatively noisy environments compared to the laboratory training environment.

Two successful techniques have been developed for speech recognition in noisy environments. The first of these is the vector Taylor series (VTS) method. The VTS method is described in Acero et al: "HMM adaptation using vector Taylor series for noisy speech recognition", In *ICSLP*-2000, vol. 3, 869-872. The VTS method compensates the HMM on each Gaussian mixture level. The system uses the mean value of each mixture as the Taylor extension points and calculates the Taylor extension matrices for each mixture. The likelihood during recognition is then expressed as:

$$p(y|m) = N(y; \mu_y^m, \Sigma_y^m) \quad (a)$$

where p(y|m) is the likelihood of the Gaussian mixture m from the noisy speech feature y, $\mu_y$ and $\Sigma_y$ are the Gaussian mixture mean and variance.

In the VTS, it is assumed that the relationship between noisy and clean features is as follows:

$$y = x + h + g(x, n, h) = x + h + C \ln(1 + e^{C^{-1}(n-x-h)}) \quad (b)$$

where y is the noisy speech feature, x the corresponding clean speech feature, C the discrete cosine transform matrix and n and h the static features for additive and convolutional noise respectively.

Given a Taylor extension point $(x_e, n_e, h_e)$, the above non-linear relation can be linearly approximated by the first-order Taylor series as:

$$y \approx x_e + h_e + g(x_e, n_e, h_e) + W(x - x_e) + (I - W)g(x_e, n_e, h_e)(n - n_e) + W(h - h_e)$$

$$W = I + \nabla_x g(x_e, n_e, h_e) \quad (c)$$

By using the above relations, it is possible to relate the mean and variance of a Gaussian for clean speech to the mean and variance of a Gaussian for noisy speech. This can be done for the static, delta and delta-delta parts of the received signal. By applying these conversions, it is possible to adapt the trained clean model for the noisy environment.

The above method suffers from the problem in that it is computationally very laborious since conversion parameters need to be calculated for each Gaussian in the HMM. Generally, in this procedure, only the first order Taylor series expansion is used.

An alternative method is the so-called joint uncertainty decoding (JUD) method, which is described in Liao, H./Gales, M. J. F. (2005): "Joint uncertainty decoding for noise robust speech recognition", In *INTERSPEECH*-2005, 3129-3132. The JUD method calculates the output probability for the mixture m as follows:

$$p(Y|m) = |A_r| N(A_r Y + b_r; \Lambda_x^m, \Xi_x^m + \Xi_b^r) \quad (d)$$

It is assumed that mixture m belongs to the $r^{th}$ regression class the method is performed in a class-by-class basis. This means that the JUD transforms relate to the same regression class are defined as:

$$A_r = \Xi_x^r (\Xi_{yx}^r)^{-1}, b_r = \Lambda_x^r - A_r \Lambda_y^r$$

$$\Xi_b^r = A_r \Xi_y^r A_r^T - \Xi_x^r \quad (e)$$

Where $\Lambda_x^r$, $\Xi_x^r$, $\Lambda_y^r$, and $\Xi_y^r$ are respectively the mean and covariance for clean and noisy speech in regression class r, and $\Xi_{yx}^r$ is the cross covariance matrix.

As JUD transforms are usually obtained by Taylor expansion, JUD is the same as VTS except that JUD only computes Taylor expansion on each regression classes. Furthermore, most compensations in JUD are applied on feature vectors instead of HMM parameters which makes the adaptation process independent of the size of HMM. Therefore JUD is much faster than VTS on adaptation.

However, one problem for JUD is the difficulty of applying non-diagonal transforms because it results in non-diagonal covariance matrices for decoding and the computational cost becomes extremely high. As a consequence, JUD implementation often uses diagonal transforms and the performance is observed to be much worse than VTS.

SUMMARY OF THE INVENTION

The present inventors have attempted to address the above problem and derive a speech recognition method which is computationally on a par with a JUD method but which achieves accuracy similar to that of VTS methods.

The present invention at least partially addresses the above problems and in first aspect provides a speech recognition method, comprising:

receiving a speech input in a first noise environment which comprises a sequence of observations;

determining the likelihood of a sequence of words arising from the sequence of observations using an acoustic model, comprising:

providing an acoustic model for performing speech recognition on a input signal which comprises a sequence of observations, wherein said model has been trained to recognise speech in a second noise environment, said model having a plurality of model parameters relating to the probability distribution of a word or part thereof being related to an observation;

adapting the model trained in the second environment to that of the first environment;

the speech recognition method further comprising determining the likelihood of a sequence of observations occurring in a given language using a language model;

combining the likelihoods determined by the acoustic model and the language model and outputting a sequence of words identified from said speech input signal, wherein adapting the model trained in the second environment to that of the first environment comprises:

adapting the model parameters of the model trained in the second noise environment to those of the first noise environment using transform parameters to produce a target distribution, wherein the transform parameters have a block diagonal form and are applied to regression classes, each regression class comprising a plurality of probability distributions;

mimicking the target distribution using a linear regression type distribution, said linear regression type distribution comprising mimicked transform parameters;

and estimating the mimicked transformed parameters.

In a preferred embodiment the model parameters of the model trained in the second noise environment are adapted to those of the first noise environment using a VTS-JUD compensation of the type:

$$p(y|m) = N(y; B^{(rm)}(\mu_x^{(m)} - b^{(rm)}), \text{diag}(B^{(rm)}(\Sigma_x^{(m)} + \Sigma_b^{(rm)})B^{(rm)T}))$$

wherein y is a feature vector for noisy speech, m is a component index indicating a probability distribution relating a word or part thereof to a feature vector, $\mu_x^{(m)}$ is the mean of the distribution m in the second noise environment and $\Sigma_x^{(m)}$ the covariance matrix of the distribution m in the second noise environment, and $$A^{(rm)} = B^{(rm)-1} = \Sigma_x^{(rm)}(\Sigma_{yx}^{(rm)})^{-1},$$

$$b^{(rm)} = \mu_x^{(rm)} - A^{(rm)}\mu_y^{(rm)}$$

$$\Sigma_b^{(rm)} = A^{(rm)}\Sigma_y^{(rm)}A^{(rm)T} - \Sigma_x^{(rm)}$$

where $\mu_x^{(rm)}$, $\mu_y^{(rm)}$, $\Sigma_x^{(rm)}$, $\Sigma_y^{(rm)}$, $\Sigma_{xy}^{(rm)}$ and $\Sigma_{yx}^{(rm)}$ are mean, covariance and cross-covariances for the second noise environment and first noise environment respectively in each regression class VTS-JUD is able to employ block-diagonal JUD transformation to compensate HMM means. This gives good model compensation, but at the expense of poor efficiency compared to JUD. The use of the linear regression type distribution allows the transforms to be applied in feature space. Other types of distributions may also be used to mimic the target distribution with transforms which may be applied in feature space.

In a further preferred embodiment, the linear regression type distribution is a PCMLLR type distribution of the form:

$$p_c(y|m) = |A_c^{(rm)}| N(A_c^{(rm)}y + b_c^{(rm)}; \mu_x^{(m)}, \Sigma_x^{(m)})$$

Where $A_c^{(rm)}$ and $b_c^{(rm)}$ are the PCMLLR transforms, y is the feature vector for noisy speech, m is a component index indicating a probability distribution relating a word or part thereof to a feature vector, $\mu_x^{(m)}$ is the mean of the distribution m in the second noise environment and $\Sigma_x^{(m)}$ the covariance matrix of the distribution m in the second noise environment.

As explained above, the PCMLLR framework allows the transforms to be applied in feature space.

The mimicked transform parameters may be estimated by minimising the divergence between the linear regression type distribution and the target distribution. The divergence may be calculated as the Kullback-Leibler divergence.

In a preferred embodiment, the target distribution comprises a mean and covariance, and said covariance in the target distribution is diagonalised when determining the mimicked transform parameters.

For example, if the target distribution uses VTS-JUD which is mimicked using PCMLLR, the off diagonal terms in the covariance matrix are sensitive to approximation errors, therefore the diagonal form of the covariance is desirable.

In a preferred embodiment, estimation of the mimicked transform parameters comprises separating calculations which need to be performed for all probability distributions from those which are regression class dependent and separately determining and caching the results from the calculations which need to be performed for all probability distributions.

It may also be preferable to approximate the variance with an averaged variance as this is found to reduce the computation cost when calculating second order statistics for estimating PCMLLR transforms.

Generally, the probability functions are Gaussians and the acoustic model is a Hidden Markov Model.

In many situations the first environment is a noisy environment and the second environment is a noise free environment. However, it will be appreciated by those skilled in the art that the present invention can be used to adapt a model between any two environments with different noise levels.

The method may be embodied in a system such that the system always applies the method without performing any test for noisiness of the environment. Alternatively, a noise test may be performed first to see if the noise conditions warrant the use of compensating the model as described above.

The invention may be used as part of a speech translation system where the output of the above method is translated into a different language; and outputted said recognised speech in said different language. The outputting may comprise using a text to speech conversion method.

Thus, in a second aspect, the present invention provides a speech translation method, comprising:

recognising a speech input signal as described above translating said recognised speech into a different language; and outputting said recognised speech in said different language.

Outputting said recognised speech may comprise using a text to speech conversion method.

The present invention may also be used to adapt a model which has been trained in a second environment to operate in a first environment.

Thus, in a third aspect, the present invention provides a method of adapting a speech recognition model between first and second noise environments, the method comprising:

providing a model for performing speech recognition on a input signal which comprises a sequence of observations, wherein said model has been trained to recognise speech in a second noise environment, said model having a plurality of model parameters relating to the probability distribution of a word or part thereof being related to an observation; and adapting the model trained in the second environment to that of the first environment;

wherein adapting the model parameters of the model trained in the second noise environment to those of the first noise environment using transform parameters to produce a target distribution, wherein the transform parameters have a block diagonal form and are applied to regression classes, each regression class comprising a plurality of probability distributions;

mimicking the target distribution using a linear regression type distribution, said linear regression type distribution comprising mimicked transform parameters;

and estimating the mimicked transformed parameters.

The present invention also provides a training method for an acoustic model to be used in speech recognition. Therefore, in a fourth aspect, the present invention provides a method of training a speech recognition system in a noise environment, said speech recognition system comprising an acoustic model, said model having a plurality of model parameters relating the probability distribution of a word or part thereof being to an observation or utterance, said model parameters comprising canonical model parameters and mimicked transform parameters which relate the canonical model parameters to the noise environment of the model during training, said mimicked transform parameters being estimated from a linear regression type distribution which is used to mimic a target distribution relating the canonical model parameters to the model parameters in the noise environment, the transform parameters of said target distribution having a block diagonal form which are applied to regression classes, each regression class comprising a plurality of probability distributions;

wherein training said model comprises:
expressing the auxiliary function of an Expectation Maximisation algorithm in terms canonical model parameters and mimicked transform parameters;
estimating mimicked transform parameters and canonical model parameters using a maximum likelihood method applied to said Expectation Maximisation algorithm.

The above method may be performed in an adaptive or non-adaptive manner. When used in a non-adaptive manner, all training data is used in the same way. For adaptive training transforms are used to normalise the noise in each training utterance and then train an acoustic model. Therefore an adaptively trained model should be better as the noise is removed as training progresses.

In a fifth aspect, the present invention provides a speech recognition system, comprising:
a receiver for receiving a speech input in a first noise environment which comprises a sequence of observations;
a processor configured to:
determine the likelihood of a sequence of words arising from the sequence of observations using an acoustic model, comprising:
provide an acoustic model for performing speech recognition on a input signal which comprises a sequence of observations, wherein said model has been trained to recognise speech in a second noise environment, said model having a plurality of model parameters relating to the probability distribution of a word or part thereof being related to an observation;
adapt the model trained in the second environment to that of the first environment;
determine the likelihood of a sequence of observations occurring in a given language using a language model; and
combine the likelihoods determined by the acoustic model and the language model,
the system further comprising an output configured to output a sequence of words identified from said speech input signal;
wherein adapting the model trained in the second environment to that of the first environment comprises:
adapting the model parameters of the model trained in the second noise environment to those of the first noise environment using transform parameters to produce a target distribution, wherein the transform parameters have a block diagonal form and are applied to regression classes, each regression class comprising a plurality of probability distributions;
mimicking the target distribution using a linear regression type distribution, said linear regression type distribution comprising mimicked transform parameters;
and estimating the mimicked transformed parameters.

In a sixth aspect, the present invention provides a computer running a computer program configured to cause a computer to perform any of the above methods, The present invention can be implemented either in hardware or on software in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

BRIEF DESCRIPTION OF THE DRAWINGS

The present invention will now described with reference to the following non-limiting embodiments in which.

DETAILED DESCRIPTION OF THE INVENTION

Figure 1:
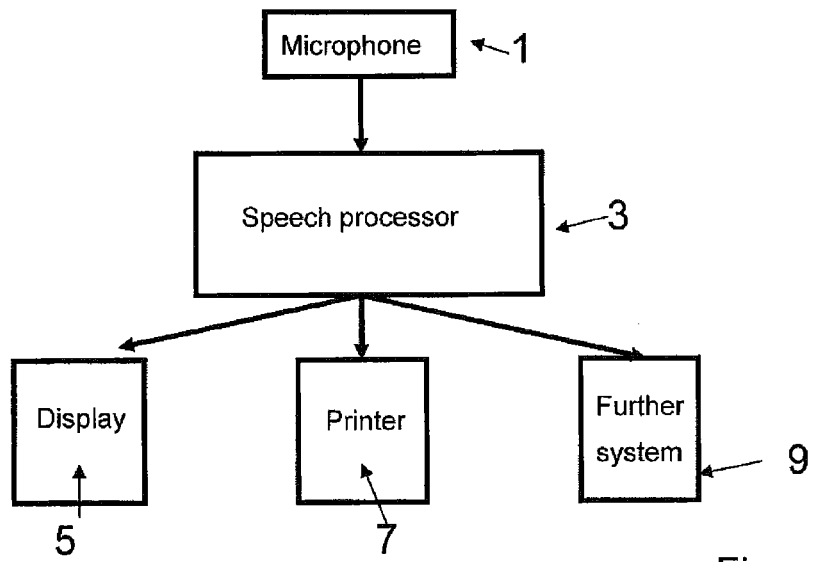
FIG. 1 is a schematic of a general speech recognition system.

FIG. 1 is a schematic of a very basic speech recognition system. A user (not shown) speaks into microphone 1 or other collection device for an audio system. The device 1 could be substituted by a memory which contains audio data previously recorded or the device 1 may be a network connection for receiving audio data from a remote location.

The speech signal is then directed into a speech processor 3 which will be described in more detail with reference to FIG. 2.

The speech processor 3 takes the speech signal and turns it into text corresponding to the speech signal. Many different forms of output are available. For example, the output may be in the form of a display 5 which outputs to a screen. Alternatively, the output could be directed to a printer or the like. Also, the output could be in the form of an electronic signal which is provided to a further system 9. For example, the further system 9 could be part of a speech translation system which takes the outputted text from processor 3 and then converts it into a different language. The converted text is then outputted via a further text or speech system.

Alternatively, the text outputted by the processor 3 could be used to operate different types of equipment, for example, it could be part of a mobile phone, car, etc. where the user controls various functions via speech. The output could be used in an in-car navigation system to direct the user to a named location.

Figure 2:
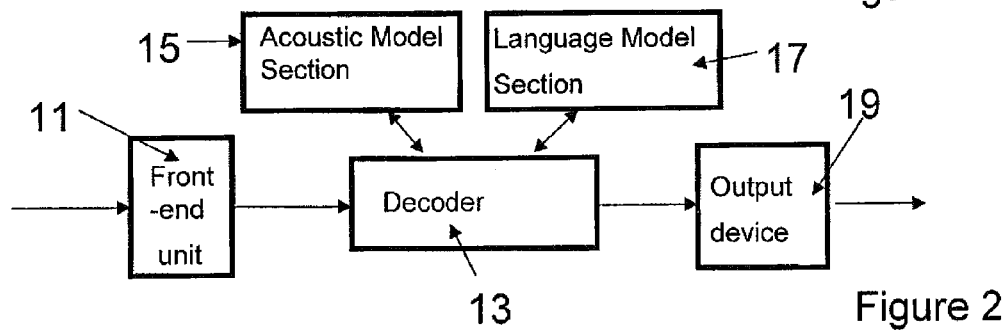
FIG. 2 is a schematic of the components of a speech recognition processor.

FIG. 2 is a block diagram of the standard components of a speech recognition processor 3 of the type shown in FIG. 1. The speech signal received from microphone, through a network or from a recording medium 1 is directed into front-end unit 11.

The front end unit 11 digitises the received speech signal and splits it into frames of equal lengths. The speech signals are then subjected to a spectral analysis to determine various parameters which are plotted in an "acoustic space of feature space". The parameters which are derived will be discussed in more detail later.

The front end unit 11 also removes signals which are believed not to be speech signals and other irrelevant information. Popular front end units comprise apparatus which use filter bank (F BANK) parameters, MelFrequency Cepstral Coefficients (MFCC) and Perceptual Linear Predictive (PLP) parameters. The output of the front end unit is in the form of an input vector which is in n-dimensional acoustic space.

The input vector is then fed into a decoder 13 which cooperates with both an acoustic model section 15 and a language model section 17. The acoustic model section 15 will generally operate using Hidden Markov Models. However, it is also possible to use acoustic models based on connectionist models and hybrid models.

The acoustic model unit 15 derives the likelihood of a sequence of observations corresponding to a word or part thereof on the basis of the acoustic input alone.

The language model section 17 contains information concerning probabilities of a certain sequence of words or parts of words following each other in a given language. Generally a static model is used. The most popular method is the N-gram model.

The decoder 13 then traditionally uses a dynamic programming (DP) approach to find the best transcription for a given speech utterance using the results from the acoustic model 15 and the language model 17.

This is then output via the output device 19 which allows the text to be displayed, presented or converted for further use e.g. in speech to speech translation or to control a voice activated device.

This description will be mainly concerned with the use of an acoustic model which is a Hidden Markov Model (HMM). However, it could also be used for other models.

The actual model used in this embodiment is a standard model, the details of which are outside the scope of this patent application. However, the model will require the provision of probability density functions (pdfs) which relate to the probability of an observation represented by an acoustic vector (speech vector or feature vector) being related to a word or part thereof. Generally, this probability distribution will be a Gaussian distribution in n-dimensional space.

Figure 3:
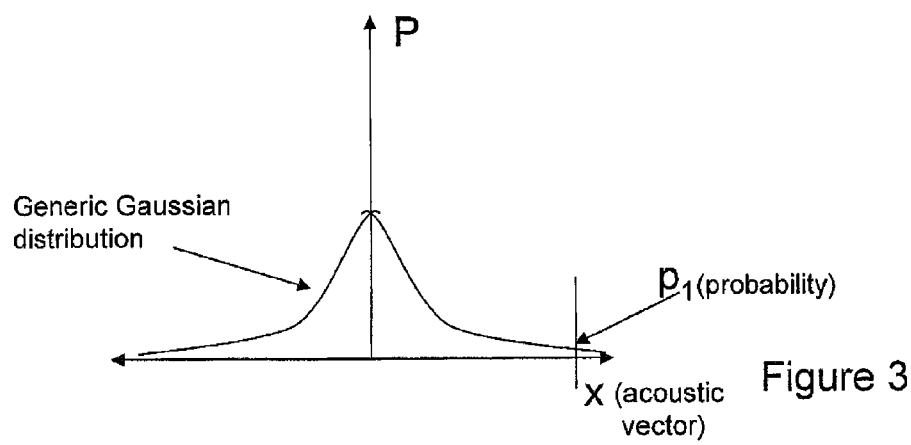
FIG. 3 is a schematic of a Gaussian probability function.

A schematic example of a generic Gaussian distribution is shown in FIG. 3. Here, the horizontal axis corresponds to a parameter of the input vector in one dimension and the probability distribution is for a particular word or part thereof relating to the observation. For example, in FIG. 3, an observation corresponding to an acoustic vector x has a probability p1 of corresponding to the word whose probability distribution is shown in FIG. 3. The shape and position of the Gaussian is defined by its mean and variance. These parameters are determined during training for the vocabulary which the acoustic model, they will be referred to as the "model parameters".

In a HMM, once the model parameters have been determined, the model can be used to determine the likelihood of a sequence of observations corresponding to a sequence of words or parts of words.

Figure 4:
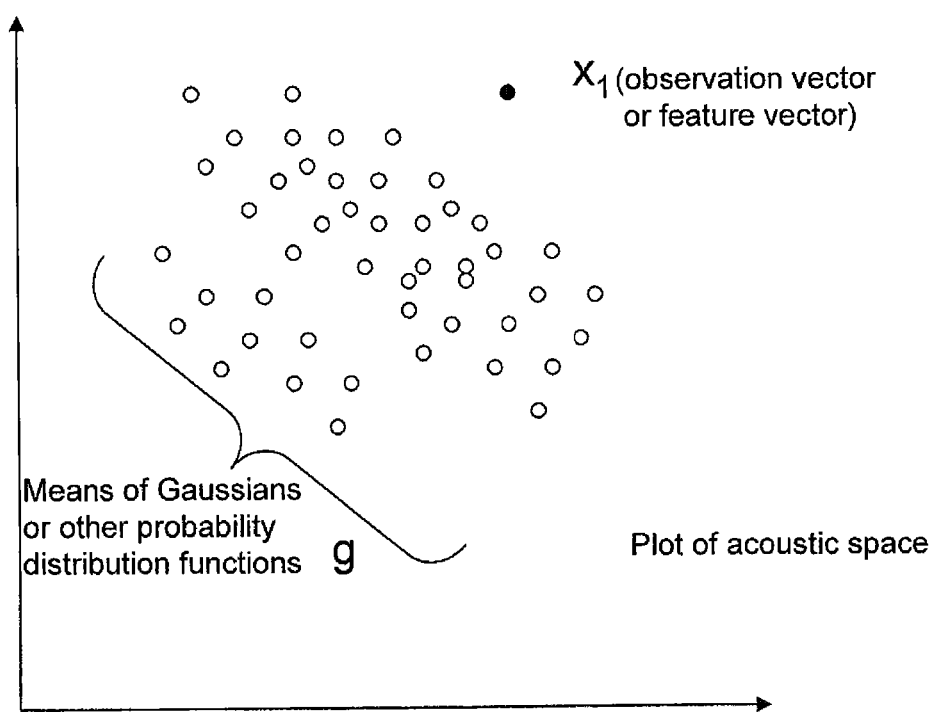
FIG. 4 is a schematic plot of acoustic space representing both probability density functions and an observation vector.

FIG. 4 is schematic plot of acoustic space where an observation is represented by an observation vector or feature vector $x_1$. The open circles g correspond to the means of Gaussians or other probability distribution functions plotted in acoustic space.

During decoding, the acoustic model will calculate a number of different likelihoods that the feature vector $x_1$ corresponds to a word or part thereof represented by the Gaussians. These likelihoods are then used in the acoustic model and combined with probabilities from the language model to determine the text spoken.

The acoustic model is generally trained under noise-free or so-called "clean" conditions. However, the error rate of the system will increase if the speech inputted into the system is then collected under noisier conditions. The front-end unit 11 described with reference to FIG. 2 can remove some of the noise. However, some of it is so engrained into the inputted speech signal that it is impossible to remove at this early stage.

Figure 5:
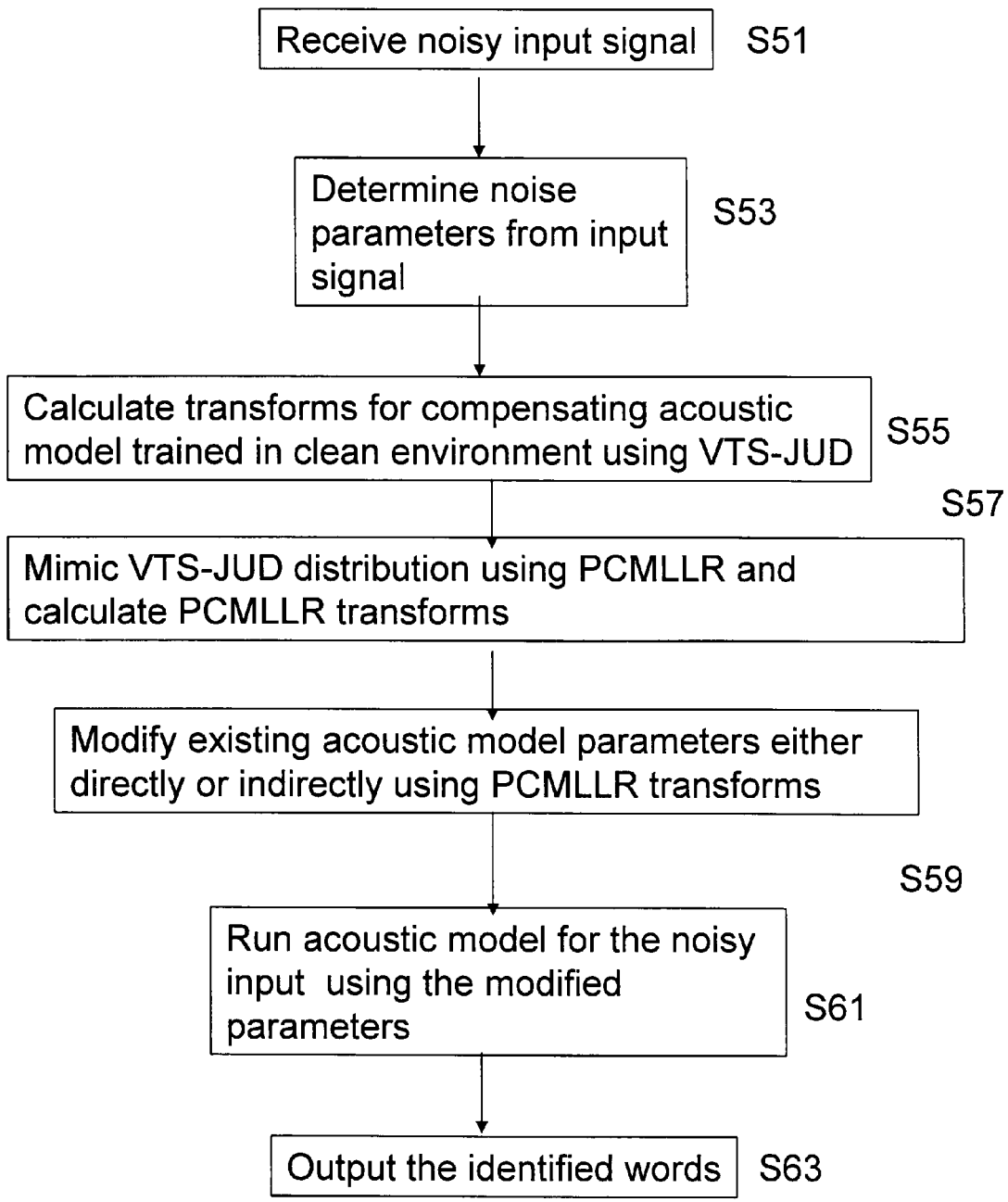
FIG. 5 is a flow diagram showing a speech recognition method in accordance with an embodiment of the present invention.

FIG. 5 is a flow diagram of a method in accordance with an embodiment of the present invention for coping with a noisy input signal when using an acoustic model which has been trained under clean conditions. First, the noisy input signal is collected in S51. This has been explained with reference to FIGS. 1 and 2.

An indication of the noise in this signal is then determined in step S53. A possible method of estimating the noise is to evaluate a part of the input signal where there is no speech. Often the first and last few frames are assumed to have no speech. Other methods may be used such as estimating noise in the signal without checking to see if the signal is voiced or non-voiced.

In Step S55 the model which has been trained under clean conditions is transformed using transform parameters to a noisy environment using, in this preferred embodiment, using a distribution which a combination of the known Vector Taylor Series (VTS) and the known Joint Uncertainty Decoding (JUD).

In the classical Hidden Markov Model (HMM) based ASR, the core part is the calculation of the HMM state emission probability modelled by the GMM:

$$p(x|S) = \sum_{m \in S} c_m p(x|m) \quad (1)$$

$$= \sum_{m \in S} c_m N\left(x; \mu_x^{(m)}, \Sigma_x^{(m)}\right)$$

where x is the clean speech feature, S is the HMM state, and $N(x; \mu_x^{(m)}, \Sigma_x^{(m)})$ is the Gaussian PDF for the mixture m with mean $\mu_x^{(m)}$, covariance matrix $\Sigma_x^{(m)}$ and mixture weight $c_m$.

When noise exists in the input speech, the clean speech feature x is not observable any more. Instead, the output probability of noisy speech feature y on the mixture m can be obtained as follows:

$$p(y|m) = \int p(y|x,m)p(x|m)dx \quad (2)$$

For model based joint compensation, each HMM mixture m is often assigned to a fixed regression class rm and the joint distribution $p(y, x|r_m)$ can be modelled by Gaussian distribution:

$$p(y, x \mid r_m) = \mathcal{N}\left(\begin{bmatrix} x \\ y \end{bmatrix}; \begin{bmatrix} \mu_x^{(r_m)} \\ \mu_y^{(r_m)} \end{bmatrix}, \begin{bmatrix} \Sigma_x^{(r_m)} & \Sigma_{yx}^{(r_m)} \\ \Sigma_{xy}^{(r_m)} & \Sigma_y^{(r_m)} \end{bmatrix}\right) \quad (3)$$

Where $\mu_x^{(r_m)}$, $\mu_y^{(r_m)}$, $\Sigma_x^{(r_m)}$, $\Sigma_y^{(r_m)}$, $\Sigma_{xy}^{(r_m)}$ and $\Sigma_{yx}^{(r_m)}$ are mean, covariance and cross-covariances for clean and noisy speech in each regression class, and $\Sigma_x^{(r_m)}$ is normally assumed to be diagonal.

Therefore, Eq. (2) becomes $$p(y \mid m) \approx \int p(y \mid x, r_m) p(x \mid m) dx \quad (4)$$

$$= \mathcal{N}\left(y; B^{(r_m)}(\mu_x^{(m)} - b^{(r_m)}), B^{(r_m)}\left(\Sigma_x^{(m)} + \Sigma_b^{(r_m)}\right) B^{(r_m)T}\right)$$

$$= \mid A^{(r_m)} \mid \mathcal{N}\left(A^{(r_m)}y + b^{(r_m)}; \mu_x^{(m)}, \Sigma_x^{(m)} + \Sigma_b^{(r_m)}\right) \quad (5)$$

And the transforms are obtained as $$A^{(r_m)}B^{(r_m)^{-1}} = \Sigma_x^{(r_m)}(\Sigma_{yx}^{(r_m)})^{-1}, \; b^{(r_m)} = \mu_x^{(r_m)} - A^{(r_m)}\mu_y^{(r_m)}$$

$$\Sigma_b^{(r_m)} = A^{(r_m)} \Sigma_y^{(r_m)} A^{(r_m)T} - \Sigma_x^{(r_m)} \quad (6)$$

Both Eq. (4) and Eq. (5) can be used for HMM adaptation. Applying all the transformations on HMM parameters, Eq. (4) has to conduct the compensation mixture by mixture, making it very slow especially when the size of HMM is big. As a contrast, Eq. (5) is much more efficient because most of the transformations happen on feature vectors.

There are several ways to obtain $\mu_y^{(r_m)}$, $\Sigma_y^{(r_m)}$ and $\Sigma_{yx}^{(r_m)}$. One of the most efficient is the first order Taylor expansion which linearly approximates the relationship between clean and noisy speech on their static parts:

$$y_s = \mu_{xs}^{(r_m)} + g(\mu_{xs}^{(r_m)}, \mu_{ns}, \mu_{hs}) + W(x_s - \mu_{xs}^{(r_m)}) + (I - W)(n_s - \mu_{ns}) \quad (7)$$

$$W = \frac{dy_s}{dx_s}\bigg|_{x_s = \mu_{xs}^{(r_m)}, n = \mu_{ns}}$$

$$g(\mu_{xs}^{(r_m)}, \mu_{ns}, \mu_{hs}) = h + C\ln\left(I + e^{C^{-1}\left(\mu_{ns} - \mu_{hs} - \mu_{xs}^{(r_m)}\right)}\right)$$

and n denotes additive noise, h convolutional noise, s for the static part, $\mu_{ns}$ the static mean of noise, I the identity matrix and C the discrete cosine transformation matrix.

The noise varies from frame to frame during the collection of the speech signal. However, from the frames noted above, it is possible to estimate the mean of the additive noise, the variance of the additive noise, the mean of the convolutional noise and the variance of the convolutional noise. Generally, it is assumed that the convolutional noise is constant over each utterance and therefore its variance is assumed to be 0.

It is also possible to estimate the delta and delta-delta terms of the mean and variance of the noise. The delta term is the first derivative with respect to time of the mean or variance and the delta-delta term is the second derivative with respect to time of the mean or variance.

From Eq. 7;

$$\Sigma_y^{(r_m)} = K \Sigma_x^{(r_m)} K^T + (I - K) \sum_n (I - K)^T \quad (8)$$

$$\Sigma_{yx}^{(r_m)} = K \Sigma_x^{(r_m)}$$

$$K = \begin{pmatrix} W & 0 & 0 \\ 0 & W & 0 \\ 0 & 0 & W \end{pmatrix} \quad (9)$$

As W is normally a full matrix, it is clear that both $\Sigma_y^{(r_m)}$ and $\Sigma_{yx}^{(r_m)}$ have a block diagonal structure. According to Eq. (6), this results in $A^{(r_m)}$ and $\Sigma_b^{(r_m)}$ being block diagonal.

Though providing good compensation for HMM, the block diagonal structure makes the adapted covariance matrices in Eq. (4) and Eq. (5) also block diagonal and the computational cost for decoding becomes extremely high. Diagonalising $\Sigma_b^{(r_m)}$ is able to make the covariance in Eq. (5) diagonal. This however does not work properly as it causes problems for the diagonal components in the covariance matrices of y. In practice, this problem can be solved by JUD or VTS-JUD of the preferred embodiment.

Joint Uncertainty Decoding (JUD), Equation (5) is used and the covariance terms $\Sigma_y^{(r_m)}$, $\Sigma_{xy}^{(r_m)}$ and $\Sigma_{yx}^{(r_m)}$ in the joint distribution are diagonalised. According to Eq. (6), this leads to a diagonal $A^{(r_m)}$ and diagonal $\Sigma_b^{(r_m)}$ in which the $i^{th}$ elements are obtained as:

$$a_i^{(r_m)} = \frac{\sigma_{x,i}^{(r_m)^2}}{\sigma_{yx,i}^{(r_m)}}, \quad (10)$$

$$\sigma_{b,i}^{(r_m)^2} = a_i^{(r_m)^2} \sigma_{y,i}^{(r_m)^2} - \sigma_{x,i}^{(r_m)^2}$$

where $\sigma_{x,i}^{(r_m)^2}$, $\sigma_{y,i}^{(r_m)^2}$ $\sigma_{yx,i}^{(r_m)}$ are the $i^{th}$ diagonal element in $\Sigma_y^{(r_m)}$, $\Sigma_{xy}^{(r_m)}$ and $\Sigma_{yx}^{(r_m)}$, respectively.

Then the compensation for JUD is fulfilled for each feature dimension independently:

$$p(y \mid m) = \quad (11)$$

$$\prod_i \mid a_i^{(r_m)} \mid \mathcal{N}\left(a_i^{(r_m)}\left(y_i - \mu_{y,i}^{(r_m)}\right) + \mu_{x,i}^{(r_m)}; \mu_{x,i}^{(m)}, \sigma_{x,i}^{(m)^2} + \sigma_{b,i}^{(r_m)^2}\right)$$

Clearly, compensation with JUD is highly efficient because it is based on the efficient form of Eq. (5) and only requires simple computation with scalars on each dimension. The diagonal $A^{(r_m)}$ however has negative impact on recognition performance as it gives poor compensation on HMM, especially on the mean vectors.

In accordance with an embodiment of the present invention, the compensation is performed using a new adaptation formula Vector Taylor Series-Joint Uncertainty Decoding (VTS-JUD). VTS-JUD is employed to handle the problem of block-diagonal covariances. Different from JUD, VTS-JUD compensates HMM based on Eq. (4) and diagonalises the final adapted HMM:

$$p(y \mid m) = \mathcal{N}(y; B^{(r_m)}(\mu_x^{(m)} - b^{(r_m)}), \text{diag}(B^{(r_m)}$$
$$(\Sigma_x^{(m)} + \Sigma_b^{(r_m)})B^{(r_m)T})) \quad (12)$$

As $B^{(r_m)}$ is block diagonal, VTS-JUD gives good compensation on HMM means and the adapted covariance part is diagonalised, making the decoding process efficient. The drawback of VTS-JUD is that it has to adapt HMM mixture by mixture. This makes the adaptation less efficient compared to JUD.

Both JUD and the new VTS-JUD are linked to the known Vector Taylor Series (VTS).

VTS is a powerful method for model compensation. It works as:

$$p(y|m) = \mathcal{N}\left(y; \mu_y^{(m)}, \text{diag}(\sum_y^{(m)})\right) \quad (13)$$
$$= \mathcal{N}\left(y; B^{(m)}(\mu_x^{(m)} - b^{(m)}), \text{diag}\left(B^{(m)} \sum_x^{(m)} B^{(m)T}\right)\right)$$

Where $\mu_y^{(m)}$ and $\Sigma_y^{(m)}$ are obtained from the first order Taylor expansion in Eq. (7). Thus, the first order Taylor expansion has to be performed on each mixture m to determine $B^{(r_m)}$ and the HMM needs to be adapted mixture by mixture. This impacts on the efficiency of this method. Using both equations (4) and (6) JUD and VTS-JUD can be reformulated as:

$$p(y|m) = N(y; B^{(r_m)}(\mu_x^{(m)} - \mu_x^{(r_m)}) + \mu_y^{(r_m)}, \text{diag}(B^{(r_m)}(\Sigma_x^{(m)} - \Sigma_x^{(r_m)})B^{(r_m)T} + \Sigma_y^{(r_m)})) \quad (14)$$

where $B^{(r_m)}$ is diagonal for JUD and block-diagonal for VTS-JUD.

From Eq. (14), VTS-JUD and JUD are actually the same except for the different structure employed for $B^{(r_m)}$. When the number of regression classes equals to the number of mixtures, i.e. $r_m = m$, $B^{(r_m)}$ is cancelled out and Eq. (14) becomes Eq. (13). In this case, VTS-JUD is the same as JUD and both techniques converge to VTS. Thus, VTS can be looked as a special case for JUD and VTS-JUD. In the normal case where the number of regression classes is much smaller than the number of mixtures, the three techniques are drifting away and behave differently. VTS-JUD and JUD only calculates transforms on each regression classes, making them much more efficient than VTS. JUD places emphasis on efficiency by using diagonal transforms, which results in the degradation of recognition performance.

The VTS-JUD method in accordance with a preferred embodiment is more similar to VTS as they both apply block-diagonal transforms and require to compensate HMM mixture by mixture. Thus, VTS-JUD is expected to have a similar recognition performance as VTS but poorer efficiency compared to JUD.

To address the efficiency issue the VTS-JUD distribution is mimicked by a further distribution in step S57. In this embodiment, the further distribution is provided by Predictive Constrained Maximum Likelihood Linear Regression (PCMLLR). This drawback is addressed by PCMLLR CMLLR [7] has been a popular method for model adaptation:

$$p_c(y|m) = |A_c^{(r_m)}| N(A_c^{(r_m)} y + b_c^{(r_m)}; \mu_x^{(m)}, \Sigma_x^{(m)}) \quad (15)$$

CMLLR transforms are usually estimated by maximising the likelihood on test utterance using standard expectation maximisation (EM) algorithm. Eq. (15) is very efficient for model compensation because all the transforms are on feature vectors.

PCMLLR also uses Eq. (15) for adaptation. However it tries to find the right CMLLR transforms which make the CMLLR distribution best mimic the target distribution. The optimal transforms $A_c^{(r_m)}$ and $b_c^{(r_m)}$ are obtained by minimising the Kullback-Leibler divergence between the CMLLR distribution defined in Eq. (15) and the target distribution $\tilde{p}(y|m)$ which is to be mimicked:

$$(A_c^{(r_m)}, b_c^{(r_m)}) = \arg\min_{A_c^{(r_m)}, b_c^{(r_m)}} \sum_{m \in r_m} P(m) \int \tilde{p}(y|m) \log \frac{\tilde{p}(y|m)}{p_c(y|m)} dy \quad (16)$$
$$= \arg\max_{A_c^{(r_m)}, b_c^{(r_m)}} \sum_{m \in r_m} P(m) \int \tilde{p}(y|m) \log p_c(y|m) dy$$

Solving the above formulae, PCMLLR transformations have similar format as CMLLR: the $i^{th}$ row in PCMLLR transforms is a function of the stats $G_i^{(r_m)}$ and $k_i^{(r_m)}$.

$$G_i^{(r_m)} = \sum_{m \in r_m} \frac{\gamma^{(m)}}{\sigma_i^{(m)2}} \begin{pmatrix} 1 & \varepsilon\{y^T|m\} \\ \varepsilon\{y|m\} & \varepsilon\{yy^T|m\} \end{pmatrix} \quad (17)$$

$$k_i^{(r_m)} = \sum_{m \in r_m} \frac{\gamma^{(m)} \mu_i^{(m)}}{\sigma_i^{(m)2}} (1 \quad \varepsilon\{y^T|m\})$$

where the expectations are estimated from the target distribution $\tilde{p}(y)$ and $\gamma^{(m)}$ is the mixture occupation obtained from training. The stats $G_i^{(r_m)}$ and $k_i^{(r_m)}$ are known in CMLLR methods, see for example M. J. F. Gales, "Maximum Likelihood Linear transforms for HMM based Speech recognition" Computer Speech and Language, vol. 12 January (1998) section 2.2.

Ideally, the target distribution should be the true distribution of y which is assumed to be Gaussian with mean $\tilde{\mu}_y^{(m)}$ and full covariance $\tilde{\Sigma}_y^{(m)}$ and expectations $\varepsilon$ in Eq. (17) are obtained as $$\varepsilon\{y|m\} = \tilde{\mu}_y^{(m)}, \varepsilon\{yy^T|m\} = \tilde{\Sigma}_y^{(m)} + \tilde{\mu}_y^{(m)} \tilde{\mu}_y^{(m)T} \quad (18)$$

Since true distribution of y is not available, in this embodiment VTS-JUD distribution is used due to its ability to apply block-diagonal transforms. Then the expectations in the statistics are obtained as:

$$\varepsilon\{y|m\} = B^{(r_m)}(\mu_x^{(m)} - b^{(r_m)})$$
$$\varepsilon\{yy^T|m\} = \text{diag}\{B^{(r_m)}(\Sigma_x^{(m)} + \Sigma_b^{(r_m)}) B^{(r_m)T}\} + \varepsilon\{y|m\} \varepsilon\{y^T|m\} \quad (19)$$

In Eq. (19), there is an option not to diagonalise the covariance part and use the block-diagonal covariance directly. This gives:

$$\varepsilon\{yy^T|m\} = B^{(r_m)}(\Sigma_x^{(m)} + \Sigma_b^{(r_m)}) B^{(r_m)T} + \varepsilon\{y|m\} \varepsilon\{y^T|m\} \quad (20)$$

As the full covariance $\tilde{\Sigma}_y^{(m)}$ in the true distribution should ideally be used, the two forms in Eq. (19) and Eq. (20) give different approximations to the true statistics. Block-diagonal covariance in Eq. (20) has a structure closer to the full covariance. However, previous work suggests that the off-diagonal terms in the VTS adapted covariance are very sensitive to approximation errors. Since this also applies to VTS-JUD, using the block-diagonal covariance to approximate is not reliable. Instead, in the preferred embodiment, the diagonal covariance is used in Eq. (19) in order to give robust approximation to $\tilde{\Sigma}_y^{(m)}$.

The approximation errors are different dependent on whether VTS-JUD or VTS-JUD based PCMLLR is used. For VTS-JUD, the diagonal covariance is used for decoding as the covariance of HMM and the approximation errors directly influence the likelihood calculation. As a contrast, VTS-JUD based PCMLLR uses the diagonal covariance only for calculating the mean square of y. As the mean square also depends on $\epsilon\{y|m\}\epsilon\{y^T|m\}$ which sometimes dominates the off-diagonal terms, the approximation errors are expected to have much smaller impact on the final PCMLLR transforms $A_c^{(r_m)}$ and $b_c^{(r_m)}$. Therefore VTS-JUD based PCMLLR are less sensitive to the approximation errors and can potentially bring better performance than VTS-JUD.

For the sake of efficiency, the key part of the statistics is reformulated. For example, one of the statistics for $G_i^{(r_m)}$ can be changed to $$\sum_{m \in r_m} \frac{\gamma^{(m)}}{\sigma_i^{(m)2}} \epsilon\{y|m\} = B^{(r_m)}\beta_i - B^{(r_m)}b^{(r_m)}\alpha_i \quad (21)$$

$$\alpha_i = \sum_{m \in r_m} \left(\frac{\gamma^{(m)}}{\sigma_i^{(m)2}}\right) \cdot B_i = \sum_{m \in r_m} \left(\frac{\gamma^{(m)}}{\sigma_i^{(m)2}} \mu_x^{(m)}\right) \quad (22)$$

Obviously, $\alpha_i$ and $\beta_i$ only need to be computed once in the beginning and cached. Then the statistics of PCMLLR can be efficiently obtained because transformations e.g. $B^{(r_m)}\beta_i$ only need to be applied once for each regression class. One exception for this is in the calculation of the second order statistics in $G_i^{(r_m)}$. This requires the computation of $B^{(r_m)}\Omega_i B^{(r_m)T}$ $$\Omega_i = \sum_{m \in r_m} \left(\frac{\gamma^{(m)}}{\sigma_i^{(m)2}} \mu_x^{(m)} \mu_x^{(m)T}\right) \quad (23)$$

As $\Omega_i$ is full and this part needs to be calculated for each regression class and each dimension. Assuming there are R regression classes and n dimension in the feature vector, the cost for this part is $O(Rn^4)$. An approximation can be made on this part by replacing $\sigma_i^{(m)2}$ with the averaged variance, i.e.:

$$\sigma_i^{(m)2} \approx \overline{\sigma_i^2} = \frac{\sum_{m \in r_m} \gamma^{(m)} \sigma_i^{(m)2}}{\sum_{m \in r_m} \gamma^{(m)}} \quad (24)$$

Then $$B^{(r_m)}\Omega_i B^{(r_m)T} \approx B^{(r_m)} \left(\sum_{m \in r_m} \gamma^{(m)} \mu_x^{(m)} \mu_x^{(m)T}\right) B^{(r_m)T} \quad (25)$$

The computational cost for this part is then now reduced to $O(Rn^3)$ because the matrix multiplication is only required once for each regression class. The overall cost is listed in table I.

TABLE 1

| Method | Statistics | Transform Estimation | Compensation |
|---|---|---|---|
| VTS | — | $O(Mn^3)$ | $O(Mn^3 + Mn)$ |
| JUD | — | $O(Rn^3)$ | $O(RTn + Mn)$ |
| VTS-JUD | — | $O(Rn^3)$ | $O(Mn^3 + Mn^2)$ |
| PCMLLR | $O(Rn^4)$ | $O(R(In^3 + n^4 + n^2))$ | $O(RTn^2)$ |
| PCMLLR (approx.) | $O(Rn^3)$ | $O(R(In^3 + n^4 + n^2))$ | $O(RTn^2)$ |

It is observed the cost of VTS-JUD based PCMLLR is independent of the HMM size M. As normally M>>R, VTS-JUD based PCMLLR is expected to be more efficient than others.

Once the transform parameters have been estimated as above, the HMM can then be used with the modified parameters in step S 61 and the identified words may be output in step S63.

In summary, the basic steps may be followed:
1. The m-dependent terms e.g.

$$\sum_{m \in r} \frac{\gamma_m}{\sigma_{m,i}^2} \text{ and } \sum_{m \in r} \frac{\gamma_m}{\sigma_{m,i}^2} \mu_m$$

may be calculated and cached first—this only needs to be performed once.
2. Perform noise estimation and VTS-JUD transforms ($A_r$, $b_r$, $\Sigma_b^r$)
3. Calculate statistics $G_i^{(r_m)}$ and $k_i^{(r_m)}$. As per equation (17) and
4, Estimate PCMLLR transforms $A_c^{(r_m)}$ and $b_c^{(r_m)}$ and compensate model using equation (15).

Figure 6:
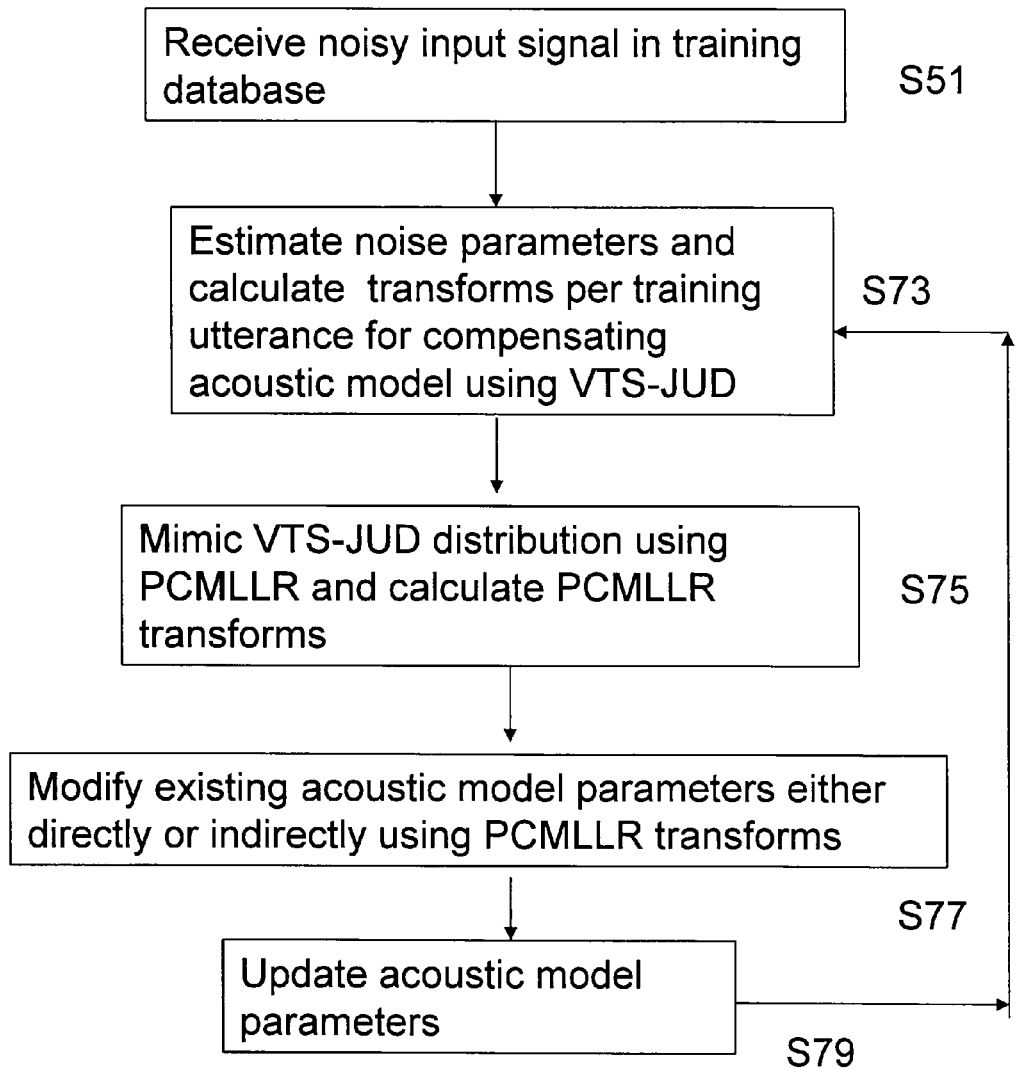
FIG. 6 is a flow diagram showing a speech recognition method in accordance with a further embodiment of the present invention.

FIG. 6 is a flow chart of a method in accordance with a further embodiment of the present invention. Here the method uses adaptive training.

Adaptive training has been widely used for speech recognition, especially for normalising speaker difference in training database. The HMM trained through adaptive training is called canonical model which has proven to give better acoustic modelling than the classical ML trained HMM.

The idea of adaptive training can be easily applied for normalising noise differences in training database. This can be achieved either by feature-based techniques or by model-based joint compensation techniques. It is generally accepted that model based compensation is more powerful than feature based compensation. Therefore model based adaptive training is expected to perform better than feature based adaptive training. In previous model based training techniques, JUD based adaptive training (JAT), is introduced. It uses Eq. (5) for compensation and then finds the optimal HMM parameters $\hat{M}=(\hat{\mu}_x^{(m)}, \hat{\Sigma}_x^{(m)})$ by maximising the EM auxiliary function:

$$Q(\hat{M} \cdot M) = \sum_{m,s,t} \gamma_t^{(m,s)} \ln |A^{(r_m)}| \mathcal{N}\left(A^{(r_m)}y_t + b^{(r_m)}; \hat{\mu}_x^{(m)}, \hat{\Sigma}_x^{(m)} + \hat{\Sigma}_b^{(r_m)}\right) \quad (26)$$

where M is the HMM parameters from the last EM iteration and used for obtaining the posterior probability $\gamma_t^{(m,s)}$ on state s and mixture m.

As VTS is a special case of JUD, it can be easily shown that JAT becomes the VTS based adaptive training (VAT) when the number of mixtures equals to the number of regression classes. Generally speaking, VAT gives better modelling on training data than JAT because VTS is more powerful than JUD for noise compensation. However, both for JAT and VAT, the objective functions have to be optimised (fully or partially) by gradient decent algorithm which is not trivial, making the training process very long. Furthermore, in order to make the compensation for training and testing consistent, JUD is normally used for decoding when JAT HMM is in place and VTS is adopted with VAT HMM. This compromises decoding performance as JUD has issues on using non-diagonal transforms in decoding and VTS has problems on its efficiency.

VTS-JUD based PCMLLR provides a good solution for adapting the HMM. It is faster than VTS and better than JUD as block-diagonal transforms can be easily applied. Therefore, this paper proposes to apply VTS-JUD based PCMLLR for adaptive training (PAT). As PCMLLR uses CMLLR as compensation formula, the objective function of PAT is the same as the objective function used in CMLLR based speaker adaptive training:

$$Q(\hat{\mathcal{M}} \cdot \mathcal{M}) = \sum_{m,s,t} \gamma_t^{(m,s)} \ln |A_c^{(r_m)}| \mathcal{N}\left(A_c^{(r_m)} y_t + b_c^{(r_m)}; \mu_x^{\prime(m)}, \hat{\Sigma}_x^{(m)}\right) \quad (27)$$

and most importantly there exists closed-form solution for HMM updates. For example, the HMM mean is obtained as:

$$\hat{\mu}_x^{(m)} = \frac{\sum_t \gamma_t^{(m,s)} (A_c^{(r_m)} y_t + b^{(r_m)})}{\sum_t \gamma_t^{(m)}} \quad (28)$$

The training procedure for PAT is
1) Run standard ML training for HMM and the ML-HMM is used as the initial model
2) For each training utterance, estimate noise parameters and calculate JUD transforms by Eq. (8) and Eq. (6) as shown in step S73
3) Calculate PCMLLR transforms $A_c^{(r_m)}$ and $b_c^{(r_m)}$ based on Eq. (19) and Eq. (17) as shown in step S75
4) Given the PCMLLR transforms for all the utterances, update HMM parameters by Eq. (28) as shown in steps S77 and S79
5) Go to step 2 S73 for more iterations with the newly estimated HMM The noise estimation part for PAT in step 2 is flexible. As used in VAT, classical VTS based EM noise estimation can be applied here. However, in the implementation in accordance with the present embodiment, a different method, JUD based EM noise estimation, is adopted. Compared to the VTS based method, this technique also finds the optimal noise parameters by maximising the likelihood on the test utterance but the noise corruption is modelled by JUD instead of VTS. The auxiliary function for JUD based noise estimation is $$\left(\hat{\mu}_n, \hat{\Sigma}_n, \hat{\mu}_h\right) =$$

$$\arg\max_{\hat{\mu}_n, \hat{\Sigma}_n, \hat{\mu}_h} \sum_{m,s,t} \gamma_t^{(m,s)} \ln |A^{(r_m)}| \mathcal{N}\left(A^{(r_m)} y_{(t)} + b^{(r_m)}; \mu_x^{(m)}, \sum_x^{(m)} + \sum_b^{(r_m)}\right) \quad (29)$$

where JUD transforms are functions of noise parameters ($\hat{\mu}_n$, $\hat{\Sigma}_n$, $\hat{\mu}_h$). Noise estimation with JUD follows a same iterative procedure as the VTS based noise estimation but it is much faster because transforms are only calculated on regression class level. Our experiments indicate the JUD based noise estimation is able to achieve almost the same accuracy on noise estimation compared to the VTS based technique. Furthermore, as VTS-JUD is applied in PCMLLR for model compensation in PAT, using JUD for noise estimation makes the whole PAT process consistent and better performance is expected. A feature based adaptive training technique has been previously presented by using SPLICE to transform all the features in training database. with a set of linear transforms. Although PAT also compensates feature vectors based on a set of linear transforms, it has major differences from the SPLICE based technique. First, feature based technique like SPLICE applies the transforms on noisy feature in one go and use the enhanced feature for decoding. As a contrast, CMLLR transforms in PAT are model dependent, i.e. same feature may use different transforms based on which HMM mixture the feature is scored on.

It has been shown that model-dependent transforms are able to provide enhanced flexibility and much better performance for compensation than pure feature based techniques. Second, the CMLLR transforms generated in PAT are supposed to mimic the behaviour of model based adaptation technique VTS-JUD. This can never be achieved by feature based adaptive training. Finally, the transforms used in SPLICE are fixed and normally pre-trained on certain training data. They are only used to update HMM. In PAT, the transforms are actually related to HMM, i.e. their generation depends on HMM parameters. Therefore PAT transforms can be jointly optimised with HMM methods giving a better fit to the training data.

Experiments were conducted on Toshiba in-car tasks which are recorded in real driving conditions with phone numbers (PH), 4 digits (4D), command control (CC) and city names (CN). Each task includes two noisy conditions i.e. engine-on (EN) and highway driving (HW). The EN condition contains 4401 utterances and has an average SNR 35 dB, whereas the HW condition contains 4582 sentences with SNR around 18 dB. The front-end employed in this paper is 39 dimension MFCC. Each feature vector consists of 13-dimensional static features with the zeroth coefficient and their delta and delta-delta components. Two training sets are used. One is for clean HMM training including 120-hour clean speech from Wall Street Journal. The other is for multi-condition training (MTR) and adaptive training, including 312 hours of data from Wall Street Journal, TIDIGITS, TIMIT and internally collected noisy training data.

All the HMMs trained are triphone with 650 states. There are 12 mixtures for each speech state in the HMM and 24 mixtures for each silence state, making the overall number of mixtures in the HMM around 8000. When VTS-JUD based PCMLLR or JUD is in place for model adaptation, 64 regression classes are employed. Word error rate (WER) averaged on the two noise conditions with clean training are provided in table II. In this case, JUD based EM noise estimation is used to estimate noise parameters for VTS, VTS-JUD, JUD and PCMLLR. It is observed that VTS is able to give fairly good compensation for noise by reducing the averaged WER to 4.6%. This is however at the expense of increased computational cost. When diagonal transforms are used in JUD, the performance drops to 5.0% as the diagonal transformations give poor compensation. VTS-JUD implemented as Eq. (12) is very powerful with a performance almost as good as VTS, indicating the importance of using non-diagonal transformation on HMM mean.

As the only difference between VTS and VTS-JUD here is the number of transforms used −8000 for VTS and 64 for VTS-JUD, this result indicates reducing the number of transforms does not have big impact on recognition performance. PCMLLR results are given in table III. Although using VTS as the target distribution in PCMLLR is as costly as using VTS directly, its result is also included here as a reference.

When the block-diagonal structure is used for PCMLLR transforms, it is observed that the proposed VTS-JUD based PCMLLR reduces WER to 4.1% which is comparable to VTS based PCMLLR (4.0%). When diagonal structure is applied for PCMLLR transforms, degradation is observed, especially on highway conditions. This indicates that the block-diagonal structure is essential for low SNR environment. Additionally, no matter what adaptation techniques are employed, using it in conjunction with PCMLLR always provides better results than using it alone. Specifically, VTS based PCMLLR outperforms VTS and VTS-JUD based PCMLLR is superior to VTS-JUD. This shows that VTS-JUD based PCMLLR is able to beat VTS-JUD on recognition performance. Finally the approximation presented in Eq. (25) is also evaluated. Although some degradation is observed, the overall performance is still better than VTS.

Table IV provides the results with multi-condition training data. VAT was implemented by using VTS for model compensation together with the VTS based noise estimation in both training and recognition. Compared to the ML training, VAT improves the performance to 2.5% and PAT is able to beat VAT with an even better performance 2.2%. Considering its efficiency, PAT seems to be the best adaptive training technique so far for noise compensation.

TABLE II

| Method | PH_EN | PH_HW | 4D_EN | 4D_HW | CC_EN | CC_HW | CN_EN | CN_HW | Average |
|---|---|---|---|---|---|---|---|---|---|
| Clean baseline | 7.1 | 76.7 | 9.5 | 70.2 | 3.8 | 91.6 | 18.9 | 100.7 | 47.3 |
| VTS | 1.0 | 3.5 | 1.3 | 3.3 | 0.8 | 1.9 | 5.7 | 19.2 | 4.6 |
| JUD | 1.1 | 4.2 | 1.1 | 3.6 | 0.8 | 2.0 | 6.1 | 20.9 | 5.0 |
| VTS-JUD | 1.0 | 3.3 | 1.2 | 3.3 | 0.8 | 1.8 | 5.7 | 19.5 | 4.6 |

Averaged wer (%) of each task for different methods with clean HMM training where JUD based methods use 64 regression classes

TABLE III

| Method | PH_EN | PH_HW | 4D_EN | 4D_HW | CC_EN | CC_HW | CN_EN | CN_HW | Average |
|---|---|---|---|---|---|---|---|---|---|
| PCMLLR(VTS) | 0.9 | 3.1 | 1.2 | 2.7 | 0.8 | 1.5 | 5.2 | 16.7 | 4.0 |
| Diag PCMLLR(VTS-JUD) | 1.1 | 4.8 | 1.0 | 3.9 | 0.7 | 2.1 | 5.7 | 17.0 | 4.5 |
| PCMLLR(VTS-JUD) | 0.9 | 3.3 | 1.2 | 2.7 | 0.8 | 1.6 | 5.1 | 17.1 | 4.1 |
| PCMLLR(VTS-JUD) - approx. | 0.9 | 3.6 | 1.2 | 3.4 | 0.8 | 1.6 | 5.4 | 19.0 | 4.5 |

Averaged WER (%) of each task for PCMLLR with clean HMM training where PCMLLR uses 64 regression classes

TABLE IV

| Method | PH_EN | PH_HW | 4D_EN | 4D_HW | CC_EN | CC_HW | CN_EN | CN_HW | Average |
|---|---|---|---|---|---|---|---|---|---|
| MTR baseline | 0.9 | 3.9 | 0.6 | 2.8 | 1.0 | 2.0 | 4.1 | 14.6 | 3.7 |
| VAT | 0.5 | 1.4 | 0.5 | 1.2 | 0.7 | 1.3 | 3.9 | 10.5 | 2.5 |
| PAT | 0.6 | 1.5 | 0.3 | 0.9 | 0.7 | 1.3 | 3.9 | 8.7 | 2.2 |

Averaged WER (%) of each task for different methods with MTR training where JUD based methods use 64 regression classes

The invention claimed is:

1. A speech recognition method implemented in a computer, comprising:

receiving a speech input in a first noise environment which comprises a sequence of observations;

determining the likelihood of a sequence of words arising from the sequence of observations using an acoustic model, comprising:

providing an acoustic model for performing speech recognition on a input signal which comprises a sequence of observations, wherein said model has been trained to recognise speech in a second noise environment, said model having a plurality of model parameters relating to the probability distribution of a word or part thereof being related to an observation;

adapting the model trained in the second environment to that of the first environment;

the speech recognition method further comprising determining the likelihood of a sequence of observations occurring in a given language using a language model;

combining the likelihoods determined by the acoustic model and the language model and outputting a sequence of words identified from said speech input signal, wherein adapting the model trained in the second environment to that of the first environment comprises:

adapting the model parameters of the model trained in the second noise environment to those of the first noise environment using transform parameters to produce a target distribution, wherein the transform parameters have a block diagonal form and are regression class dependent, each regression class comprising a plurality of probability distributions;

mimicking the target distribution using a linear regression type distribution, said linear regression type distribution comprising mimicked transform parameters;

and estimating the mimicked transformed parameters.

2. The speech recognition method of claim 1, wherein adapting the model parameters of the model trained in the second noise environment to that of the first noise environment comprises using a VTS-JUD compensation of the type:

$$p(y|m)=N(y;B^{(rm)}(\mu_x^{(m)}-b^{(rm)}), \text{diag}(B^{(rm)}(\Sigma_x^{(m)}+\Sigma_b^{(rm)})B^{(rm)T}))$$

wherein y is the feature vector for noisy speech, m is a component index indicating a probability distribution relating a word or part thereof to a feature vector, $\mu_x^{(m)}$ is the mean of the distribution m in the second noise environment and $\Sigma_x^{(m)}$ the covariance matrix of the distribution m in the second noise environment, and $$A^{(rm)}=B^{(rm)-1}=\Sigma_x^{(rm)}(\Sigma_{yx}^{(rm)})^{-1}, b^{(rm)}=\mu_x^{(rm)}-A^{(rm)}\mu_y^{(rm)}$$

$$\Sigma_b^{(rm)}=A^{(rm)}\Sigma_y^{(rm)}A^{(rm)T}-\Sigma_x^{(rm)}$$

where $\mu_x^{(rm)}$, $\mu_y^{(rm)}$, $\Sigma_x^{(rm)}$, $\Sigma_y^{(rm)}$, $\Sigma_{xy}^{(rm)}$ and $\Sigma_{yx}^{(rm)}$ are mean, covariance and cross-covariances for the second noise environment and first noise environment respectively in each regression class and $r_m$ is the regression class of component index m.

3. The speech recognition method of claim 1, wherein the linear regression type distribution is a PCMLLR type distribution of the form:

$$p_c(y|m)=|A_c^{(rm)}|N(A_c^{(rm)}y+b_c^{(rm)};\mu_x^{(m)},\Sigma_x^{(m)})$$

Where $A_c^{(rm)}$ and $b_c^{(rm)}$ are the PCMLLR transforms, y is the feature vector for noisy speech, m is a component index indicating a probability distribution relating a word or part thereof to a feature vector, $\mu_x^{(m)}$ is the mean of the distribution m in the second noise environment and $\Sigma_x^{(m)}$ the covariance matrix of the distribution m in the second noise environment.

4. The speech recognition method of claim 1, wherein estimating the mimicked transform parameters comprises minimising a divergence between the linear regression type distribution and the target distribution.

5. The speech recognition method of claim 1, wherein the target distribution comprises a mean and covariance, and said covariance in the target distribution is diagonalised when determining the mimicked transform parameters.

6. The speech recognition method of claim 1, wherein estimating the mimicked transform parameters comprises separating calculations which need to be performed for all probability distributions from those which are regression class dependent and separately determining and caching the results from the calculations which need to be performed for all probability distributions.

7. The speech recognition method of claim 3, wherein estimating the mimicked transform parameters comprises approximating the variance with an averaged variance.

8. The speech recognition method of claim 1, wherein the probability distribution functions are Gaussians.

9. The speech recognition method of claim 1, wherein the acoustic model is a Hidden Markov Model.

10. The speech recognition method of claim 1, wherein the first environment is a noisy environment and the second environment is a noise free environment.

11. A speech translation method, comprising:
recognising a speech input signal according to method of claim 1;
translating said recognised speech into a different language; and
outputting said recognised speech in said different language.

12. The speech translation method of claim 11, wherein outputting said recognised speech comprises using a text to speech conversion method.

13. A method of adapting a speech recognition model between first and second noise environments, the method comprising: on a computer, implementing:
providing a model for performing speech recognition on a input signal which comprises a sequence of observations, wherein said model has been trained to recognise speech in a second noise environment, said model having a plurality of model parameters relating to the probability distribution of a word or part thereof being related to an observation; and
adapting the model trained in the second environment to that of the first environment;
wherein adapting the model parameters of the model trained in the second noise environment to those of the first noise environment comprises using transform parameters to produce a target distribution, wherein the transform parameters have a block diagonal form and are regression class dependent, each regression class comprising a plurality of probability distributions;
mimicking the target distribution using a linear regression type distribution, said linear regression type distribution comprising mimicked transform parameters;
and estimating the mimicked transformed parameters.

14. A method of training a speech recognition system in a noise environment, said speech recognition system comprising an acoustic model, said model having a plurality of model parameters relating a probability distribution of a word or part thereof being to an observation or utterance, said model parameters comprising canonical model parameters and mimicked transform parameters which relate the canonical model parameters to the noise environment of the model during training, said mimicked transform parameters being estimated from a linear regression type distribution which is used to mimic a target distribution relating the canonical model parameters to the model parameters in the noise environment, the transform parameters of said target distribution having a block diagonal form which are regression class dependent, each regression class comprising a plurality of probability distributions;
wherein the method is implemented in a computer and comprises training said model, comprising:
expressing the auxiliary function of an Expectation Maximisation algorithm in terms canonical model parameters and mimicked transform parameters;
estimating mimicked transform parameters and canonical model parameters using a maximum likelihood method applied to said Expectation Maximisation algorithm.

15. The method of training a speech recognition system of claim 14, wherein the target distribution is a VTS-JUD compensation of the type:

$$p(y|m)=N(y;B^{(rm)}(\mu_x^{(m)}-b^{(rm)}), \text{diag}(B^{(rm)}(\Sigma_x^{(m)}+\Sigma_b^{(rm)})B^{(rm)T}))$$

wherein y is the feature vector for noisy speech, m is a component index indicating a probability distribution relating a word or part thereof to a feature vector, $\mu_x^{(m)}$ is the mean of the distribution m in the second noise environment and $\Sigma_x^{(m)}$ the covariance matrix of the distribution m in the second noise environment, and $$A^{(rm)}=B^{(rm)-1}=\Sigma_x^{(rm)}(\Sigma_{yx}^{(rm)})^{-1}, b^{(rm)}=\mu_x^{(rm)}-A^{(rm)}\mu_y^{(rm)}$$

$$\Sigma_b^{(rm)}=A^{(rm)}\Sigma_y^{(rm)}A^{(rm)T}-\Sigma_x^{(rm)}$$

where $\mu_x^{(rm)}$, $\mu_y^{(rm)}$, $\Sigma_x^{(rm)}$, $\Sigma_y^{(rm)}$, $\Sigma_{xy}^{(rm)}$ and $\Sigma_{yx}^{(rm)}$ are mean, covariance and cross-covariances for the second noise environment and first noise environment respectively in each regression class and $r_m$ is the regression class of the component index m.

16. The method of training a speech recognition system according to claim 14, wherein the linear regression type distribution is a PCMLLR type distribution of the form:

$$p_c(y|m)=|A_c^{(rm)}|N(A_c^{(rm)}y+b_c^{(rm)};\mu_x^{(m)},\Sigma_x^{(m)})$$

Where $A_c^{(rm)}$ and $b_c^{(rm)}$ are the PCMLLR transforms, y is the feature vector for noisy speech, m is a component index indicating a probability distribution relating a word or part thereof to a feature vector, $\mu_x^{(m)}$ is the mean of the distribution m in the second noise environment and $\Sigma_x^{(m)}$ the covariance matrix of the distribution m in the second noise environment.

17. A speech recognition system, comprising:
 a receiver for receiving a speech input in a first noise environment which comprises a sequence of observations;
 a processor configured to:
 determine the likelihood of a sequence of words arising from the sequence of observations using an acoustic model, comprising:
 provide an acoustic model for performing speech recognition on a input signal which comprises a sequence of observations, wherein said model has been trained to recognise speech in a second noise environment, said model having a plurality of model parameters relating to a probability distribution of a word or part thereof being related to an observation;
 adapt the model trained in the second environment to that of the first environment;
 determine the likelihood of a sequence of observations occurring in a given language using a language model; and
 combine the likelihoods determined by the acoustic model and the language model,
 the system further comprising an output configured to output a sequence of words identified from said speech input signal;
 wherein adapting the model trained in the second environment to that of the first environment comprises:
 adapting the model parameters of the model trained in the second noise environment to those of the first noise environment using transform parameters to produce a target distribution, wherein the transform parameters have a block diagonal form and are regression class dependent, each regression class comprising a plurality of probability distributions;
 mimicking the target distribution using a linear regression type distribution, said linear regression type distribution comprising mimicked transform parameters;
 and estimating the mimicked transformed parameters.

18. The system of claim 17, wherein the output comprises a display, printer or electronic signal readable by a further apparatus.

19. A non-transient carrier medium carrying computer readable instructions for controlling the computer to carry out the method of claim 1.

* * * * *